United States Patent Office 3,490,585
Patented Jan. 20, 1970

3,490,585
PROCESS AND APPARATUS FOR
CLASSIFYING FIBRES
Ronald William Gooding, Waltham Abbey, and Noel James Parratt, Loughton, England, assignors to National Research Development Corporation, London, England
Filed Jan. 20, 1967, Ser. No. 610,661
Claims priority, application Great Britain, Jan. 21, 1966, 2,828/66
Int. Cl. B07b 1/10, 1/46
U.S. Cl. 209—5    10 Claims

ABSTRACT OF THE DISCLOSURE

A process and apparatus for classifying fibres for length wherein the fibres are dispersed in a liquid which is steadily flowed onto a screen, which has a plurality of holes of a size in accordance with the length of fibres desired to be retained on the screen. The screen is in the form of a closed loop which is continuously circulating past the dispersion supply position at a rate sufficient to ensure that only a thin layer of fibres is applied to the screen. After passing the supply position the screen is inverted and liquid is flushed through it to remove the fibres retained thereon.

BACKGROUND OF THE INVENTION

Field of the invention

The present invention relates to the size classification of fibres, and is concerned with processes and apparatus for classifying fibres for length.

Fibres of various types including whiskers may be used to reinforce metals and plastics materials and improve their overall mechanical properties. To be effective the fibres should be long enough, or have a high enough aspect ratio, to ensure an adequate transfer of stress between the material and the fibres. Of any particular type of fibres employed the relatively longer fibres are therefore generally preferred in fibre-reinforced materials, especially in materials where the specific adhesion between the fibres and the material is relatively poor. The range of useful lengths of fibres depends upon the actual fibres and matrix material concerned. Comparatively short fibres can be preferred for use in materials to be extruded as longer fibres may obstruct the process and are liable to be broken into shorter lengths anyway. Also, comparatively very short fibres are useful as fillers.

Description of the prior art

The length classification of fibres has hitherto only been carried out on a small scale either by passing a dispersion of fibres in a liquid through a static screen which is arranged to be fully immersed in the carrier liquid or by blowing the fibres through a static screen or screens. A severe disadvantage of these methods which increases their inherently slow rate of operation is that layers of fibres are retained by the screens and progressively diminish the throughput rate and must then be frequently cleared from the screen. In addition, fibres which are required to be retained by the screen for the periods between clearing operations tend to be drawn through the screen at some time during the retention period so that the efficiency of the length classification is reduced.

SUMMARY OF THE INVENTION

It is an object of the invention to provide a continuous process for efficiently classifying fibres for length, even very fine and short fibres, i.e. fibres 1 mm. or less in length.

According to the present invention a process, normally a continuous process, for classifying fibres for length comprises dispersing the fibres in a liquid to form a fibre dispersion, flowing the dispersion at a dispersion supply position onto a screen in the form of a closed loop having a plurality of holes of similar size which is predetermined in accordance with the minimum length of fibres which is desired to be retained on the screen, propelling the screen past the dispersion supply position at a rate which is at least sufficient to ensure that no more than a thin layer of fibres is applied to the screen and fibres shorter than those desired to be retained are filtered through the screen, the dispersion being flowed on to the screen with a velocity component in the direction of movement of the screen and only a small velocity component in a direction perpendicular to the screen with the result that the fibre dispersion flows steadily onto the screen and fibres of at least the desired length can settle and be retained by the screen while shorter fibres are filtered through the screen, inverting the screen after it has passed the dispersion supply position so that the retained fibres are on the underside of the screen, and flushing liquid through the screen to remove the retained fibres from the screen.

In a preferred form of the process, the fibre dispersion is filtered through a cylindrical screen which is rotating at an even rate about a horizontal axis, the dispersion supply position being situated inside the cylinder above the lower part of its course, and the fibres retained on the screen are removed therefrom by liquid flushed down through the screen from above the higher part of its course.

According to a feature of the invention the dispersion is arranged to flow onto the screen in a direction substantially tangential to the direction of motion of the screen, and preferably at a similar speed. Turbulent flow and disturbances, which would tend to drive through the screen more fibres longer than mesh size, are thereby minimised, as is the possibility of damage to brittle fibres. This may be achieved by flowing the dispersion over a lip extending the width of the screen and which is parallel to and close to the screen. In a preferred form the lip is made of flexible material and its end just touches the screen. If long enough this would fulfil its purpose despite any eccentricity of the screen.

By severely limiting the thickness of the layer of fibres which is allowed to be formed on the screen in accordance with the invention, the classification of fibres can be carried out effectively and the filtration of comparatively shorter fibres through the screen is not significantly impeded. The thin layer allowed to form should normally be no more than a very few, i.e. less than five mono-layers thick, where a mono-layer is regarded as having a thickness equal to the average diameter of the great majority of the fibres.

The concentration of the fibres in the liquid is decided having regard to two conditions. The fibres must be dispersed so that they do not interfere. However the efficiency of the process is reduced with increase of liquid not only because there is a limit to the rate at which liquid can be applied to the screen but because the liquid tends to wash all fibres through the screen. The maximum permissible concentration varies inversely with the average length of the fibres.

It will be appreciated that for a particular apparatus the rate of application of fibres must be related to the rate of movement of the screen. These rates will normally be as high as possible consistent with effective operation of the apparatus and in practice it has been found that there is normally a limiting rate of movement of the screen above which the screen does not filter the fibres as required and difficulty is experienced in removing the fibres from the screen. The permitted rate of application of fibres at this maximum screen rate can be readily determined as in practice if it is exceeded the dispersion "snowballs" on the screen.

The dispersion may contain a wetting agent to aid the free dispersion of the fibres. The wetting agent should be of a type which does not froth or foam, as foam generated when the dispersion is applied may tend to carry fibres intended to pass through the screen.

While some types of fibre exhibit no gerat variation in their diameter between fibres, others, such as asbestos fibres, may vary by a factor of ten or more. As the tensile properties of the composite are generally better for higher aspect ratio fibres, those which are coarse may be undesirable. These latter types of fibres are preferably classified for diameter before being classified for length. The diameter classification may be carried out using a hydrocyclone or an elutriation column.

Good separation of fibres into two length categories can be achieved by using the above described length classification process, but the efficiency of the process can be increased further by providing a second screen in form of a closed loop around the first screen and having holes the same size as those of the first screen and which is propelled with it. In the case of the cylindrical screen, the second screen is conveniently concentric with the first. A high proportion of the fibres in the longer category will be retained by the first screen, and most of the remainder by the second.

The process for classifying fibres for length in accordance wtih the invention may be used with particular advantage in the length classification of fibres which are prone to mechanical damage or distortion, as the dispersion of the fibres in a liquid causes them to be cushioned against shocks.

A preferred form of apparatus for carrying out the process of the invention comprises one or more cylindrical screens of a similarly sized mesh, the screens being disposed concentrically about a common horizontal axis and adapted to be driven at a controlled rate of rotation. The dispersion is flowed onto the screen from a dispersion supply weir situated above the lower part of the inner surface of the inside screen so that the dispersion may be flowed onto the whole operative width of the screens at a controlled even rate. Means are provided which can flush liquid across the whole operative width of the screen or each screen from above its higher part, with receptacles for the liquid and the fibres thereby washed from the screens provided below.

The classification process as described separates fibres into two groups in accordance with their length with respect to the size of the holes in the screen. For wire mesh screens substantially all fibres longer than about twice the mesh size are retained while substantially all fibres less than about half a mesh size filter through the screen.

In order to separate fibres into more than two length groups, either the fibres filtered through, or those removed from, the screen or screens may be applied to further screens having holes of a different size. The order in which such a multi-stage process is caired out is decided having regard to the proportions of fibres of each length category contained in the bulk. When the short fibres predominate, as is usual, the dispersion is first flowed onto a screen having small holes, and the fibres removed from the screen are dispersed again and passed to screens of relatively larger size holes. A multi-stage process is conveniently carried out in apparatus having a common drive for the different sets of screens.

BRIEF DESCRIPTION OF THE DRAWING

In order that the invention may be more clearly understood a classification apparatus and its method of use will now be described, by way of example, with reference to the accompanying drawings, of which.

DESCRIPTION OF THE PREFERRED EMBODIMENT

Figure 1:
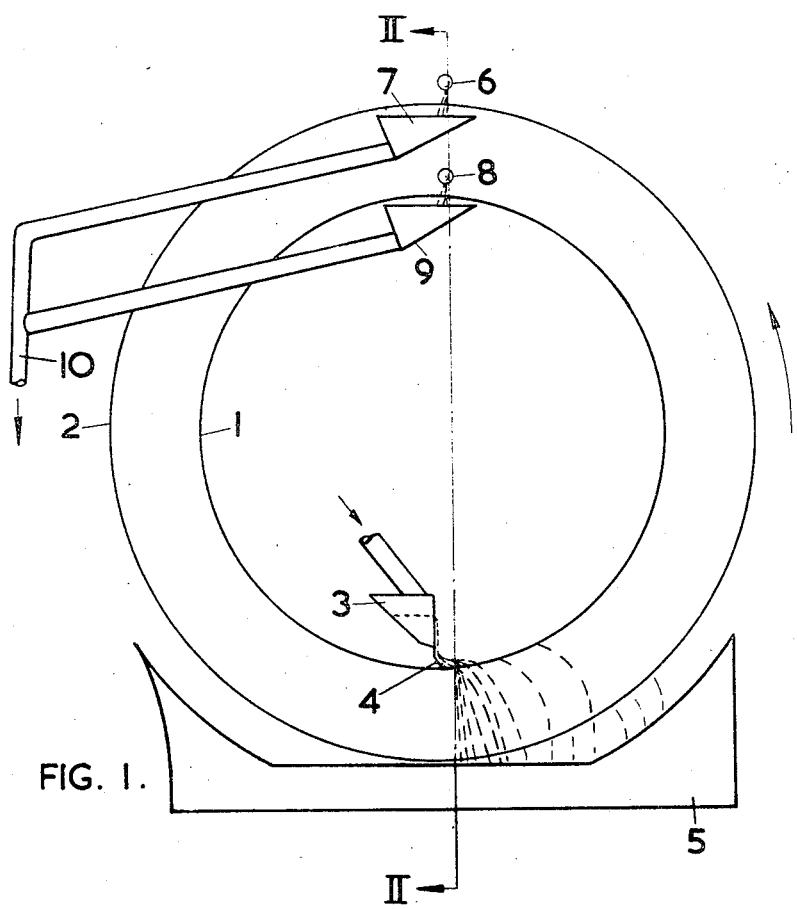
FIGURE 1 is a diagrammatic side elevation of the apparatus.
Figure 2:
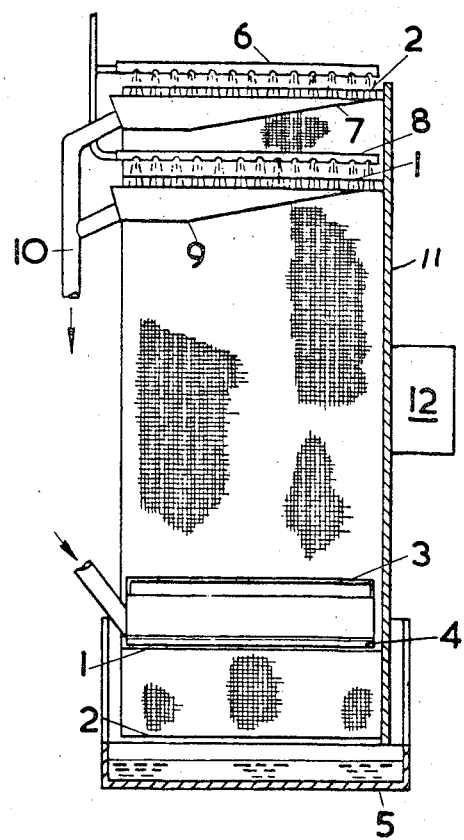
FIGURE 2 is a diagrammatic view on the section II—II FIGURE 1.

As shown in FIGURES 1 and 2 the apparatus has a cylindrical inner screen 1 and a concentric cylindrical outer screen 2 with a common horizontal axis. The screens 1 and 2 are made of metal gauze of similar mesh. A dispersion supply weir 3 is situated inside the inner screen so that it can flow dispersion onto the whole width of the screen 1. It has a flexible lip 4 made of neoprene rubber, whose free edge touches the screen, which acts to even out the flow of the dispersion and to direct it to approach the screen as nearly tangentially as possible. Situated below the outer screen 2 is a filtrate tray 5. Liquid flushing means in the form of a spray pipe 6, for spraying liquid onto the outer screen 2, is situated above the highest part of the outer screen 2. A receptacle for the liquid in the form of a gutter 7 is provided inside the outer screen 2 immediately below the spray pipe 6. Above the inner screen 1 there is an inner screen spray pipe 8, and a gutter 9 is held inside the screen 1 just below the pipe 8. The two gutters 8 and 9 feed into a common products pipe 10. The screens 1 and 2 are attached to a back plate 11 having a drive connection to an electric motor 12.

The apparatus is used to classify fibres into lengths above and below a given length in the following manner. A dispersion of the fibres in a liquid containing a nonfoaming wetting agent such as polyvinylalcohol so that the fibres are freely dispersed, is fed into the weir 3 whence it flows evenly at a controlled rate via the lip 4 onto the whole operative width of the screen in a direction substantially tangential to the screen. The screens 1 and 2 are set rotating by the motor 12 in the direction indicated in FIGURE 1. The rotation rate of the screens is such that not more than approximately a mono-layer of fibres is applied to the inner screen 1. The filtrate from the screen 1 drops to the outer screen 2. Most of the longer fibres will have been retained on the inner screen 1, and substantially the remainder of these will be retained on the inner surface of the screen 2. Most of the shorter fibres pass through both screens and are caught in the drain 4. The mono-layer of long fibres remains on the screens as they revolve until they pass under their respective sprays 6 and 8 when the fibres are washed into the gutters 7 and 9 and pass into the products pipe 10.

The fibres from the products pipe 10 may be redispersed and passed to another similar apparatus having screens of a larger mesh than the one described for further classification.

One practical apparatus, used for classifying silicon nitride whiskers whose diameters are about 1–2 microns and whose lengths vary from 10 microns to about 1 mm., has screens 1 and 2, 6 in. deep and 1½ ft. and 2 ft. in diameter respectively. The fines, or shortest whiskers are taken out by screens having a 400 mesh gauze, or apertures of 0.036 in. square. The whiskers are dispersed in water, about 0.5 gram per litre, the water containing a small amount of polyvinylalcohol, and the whisker bulk having between about $10^8$ and $10^9$ fibres per gram. The screens are rotated at 10 r.p.m. The dispersion is arranged to flow over the weir at a rate of about 1 litre per minute.

The whiskers retained on the screens and subsequently removed were re-dispersed and treated in a second similar apparatus but whose screens were 200 mesh size (apertures 0.065 in.). The whiskers retained on these screens were treated in a third apparatus whose screens were 100 mesh size (apertures 0.143 in.).

Figure 3:
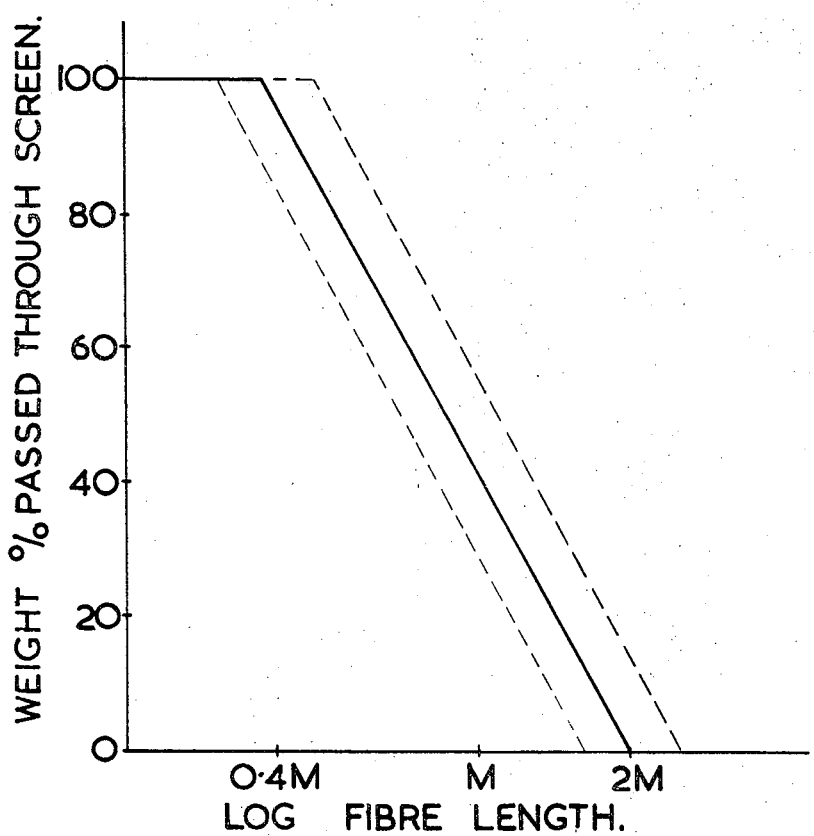
FIGURE 3 is a graph of the separation achieved with a single unit of two similar screens.

The separation of fibres achieved by passing them through two similar screens in a single stage of the process is illustrated in FIGURE 3. FIGURE 3 is a graph showing the weight percentage of each length of fibres passed through the screens. The length scale is logarithmic, and the mesh size (M) is indicated on the graph, where M is equal to the reciprocal of the mesh number. M, measured in inches, is thus the length of the aperture plus one wire diameter. The graph shows that all fibres less than about 0.4M are passed through the screen, while all fibres greater than about 2M are retained, the amount retained being proportioned to the fibre length between about 0.4M and 2M.

Figure 4:
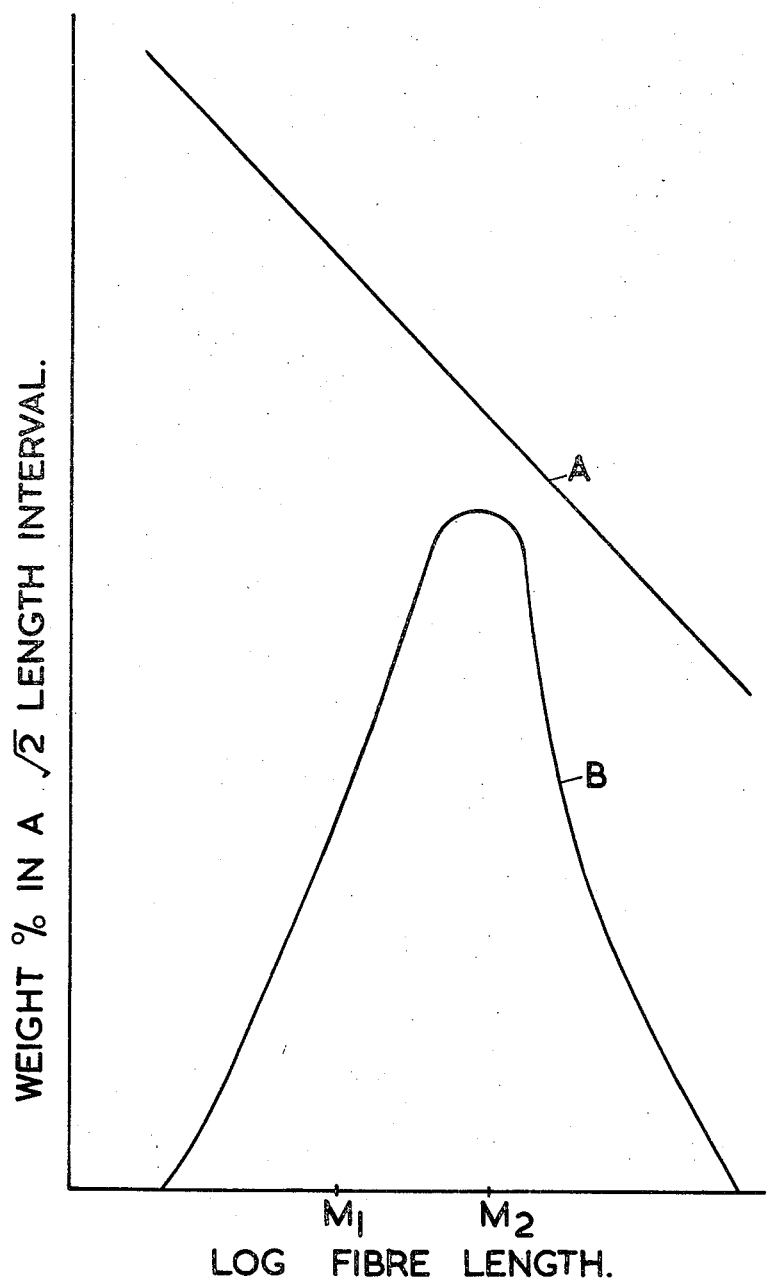
FIGURE 4 is a graph showing the separation achieved in a multi-stage process compared with the initial length distribution of the fibres.

The separation of fibres achieved in a multi-stage process is shown in FIGURE 4 which is a graph of the initial length distribution in a bulk of fibres (curve A) and of the length distribution of fibres retained on one screen (M1) but passed through the next stage (M2) (curve 13) plotted on scales of the weight percentage of fibres in each length category, of 2 mm., and the logarithm of the fibre length. The aperture size M2 is twice that M1. The curve B shows that about 40 to 50 weight percent of the fibres collected in this stage of the process are of length between the two aperture sizes.

Whiskers such as silicon nitride whiskers are capable of reinforcing materials to a degree dependent upon their aspect ratios. For example whiskers on aspect ratio of the order of 100 are suitable for enhancing the modulus of elasticity of plastics materials. If these plastics materials were to be used at stresses above those at which they are elastic the whiskers are insufficiently long considering the maximum specific shear stress obtainable between each whisker and its matrix, and cannot reinforce the matrix for strength. The table below shows the reinforcing power of silicon nitride whiskers of different aspect ratios.

TABLE

Reinforcing power of whiskers

Order of aspect ratio:
- 10 _____ Filler, or elastic modulus alone in metals.
- 100 _____ Modulus in plastics, strength in metals.
- 1,000 _____ Strength in plastics and steels, modulus in resins.
- 10,000 _____ Strength in plastics, steels and resins.

The process of the invention is capable of separating a bulk of fibres into different length categories with a high degree of distinction between each category. The fibres can be used in a matrix with predictable results, so that a reinforced matrix can be manufactured to specification.

Another practical apparatus, used for classifying asbestos fibres, has three sets of screens 1 and 2 of overall dimensions similar to those of the first practical example, but the mesh sizes are 30 mesh, 10 mesh, and ¼" mesh. Asbestos fibres obtained in a desired diameter range by passage through a hydrocyclone system, are dispersed in water in a concentration of about 3 grams per litre of water containing a small amount of polyvinylalcohol and fed at about 3 litres per minute onto the first screen set which rotates at about 10 r.p.m.

The concentration of 0.5 gram per litre for the 400 mesh screen is a maximum for the whiskers, whose average length is comparatively long (0.5 mm.). The concentration has to be even less for whiskers retained on the screen and treated subsequently, as the average length is higher, providing another reason for carrying out a multi-stage process in the order described, furthermore a small mesh screen can pass a considerably heavier amount of short whiskers per unit time per unit screen area than a large mesh screen of the same unit area can pass longer whiskers in the same unit time.

It was found that in the two examples described above, a greater speed of the inner screen than about 50 ft./min. caused splashing and carry-over of liquid, while a faster feed rate or a much higher whisker concentration reduces the efficiency of separation, as fibres build up on the screen and shorter fibres are retained.

We claim:

1. A process for classifying fibres by length which comprises dispersing the fibres in a liquid to form a fibre dispersion, flowing said fibre dispersion at a controlled rate and concentration onto a screen consisting of a closed loop of mesh moving continuously in one direction, said concentration being less than 5 monolayers of fibres being applied to said screen and said rate being such that the fibres flow onto the screen with the major component of their velocity in the direction of movement of the screen, whereby substantially all fibres longer than about twice the mesh size are retained on the screen while substantially all fibres less than about half a mesh size filter through the screen and subsequently inverting said screen and flushing the retained material from the screen with a liquid spray and separately collecting shorter fibres passing through the screen and the said retained fibres removed by the liquid spray.

2. A process according to claim 1 wherein about one monolayer is applied to the screen.

3. A process according to claim 1 wherein said shorter fibres passed through the screen are applied to a further screen in the form of a closed loop of mesh of a similar size to the aforesaid screen and which is circulating in a similar manner with the aforesaid screen.

4. A process for classifying fibres into at least three categories in stages comprising a first stage of classifying fibres into two length categories by a process according to claim 1 and a second stage of dispersing at least one of said categories of fibres in a liquid to form a fibre dispersion, flowing said dispersion on to a moving screen in the form of a closed loop of a mesh of a different size from the mesh of the screen used in the first stage at a rate and concentration such that not more than about 1 monolayer is applied to said screen and that the fibres flow on to the screen with the major component of their velocity in the direction of movement of the screen whereby fibres of at least the desired length are retained on the screen and shorter fibres are filtered through the screen, and subsequently inverting said screen and flushing the retained material from the screen with a liquid spray and separately collecting both the said shorter fibres passed through the screen and the said retained longer fibres retained by the liquid spray.

5. A fibre screening apparatus comprising a screen in the form of a closed loop of mesh, dispersion supply means arranged above the lower part of the inside surface of the screen, a screen washing device arranged above the outer surface of the upper part of the screen, separate receiving troughs positioned below the lower part of the outside surface of the screen and below the upper part of the inside surface of the screen, means for propelling the screen past the dispersion supply means wherein the dispersion supply means comprises a weir having a feed lip touching the screen in order to impart, during use, a major flow component in the direction of motion of the screen to the dispersed fibres and where the size of holes in the screen is selected so that fibres which are shorter than a desired length may be separated from fibres of at least that length.

6. Apparatus according to claim 5 wherein said feed lip is made of flexible material and extends transversely across the screen.

7. Apparatus according to claim 5 having a second screen beneath the aforesaid screen at the said dispersion supply position, for classifying fibres passed through the aforesaid screen, the second screen having holes of a size similar to those of the aforesaid screen, and means operably linking the second screen with the said propelling means, so that it is circulated with the first screen.

8. Apparatus according to claim 5 wherein said screen is a cylinder of mesh with its axis horizontal, and the propelling means is arranged to rotate the screen about its axis.

9. Apparatus according to claim 8 wherein the said dispersion supply means is situated inside the said cylinder above a lower part of its course, and the said washing means is situated outside the cylinder above a higher part of its course.

10. Apparatus according to claim 8 having a second cylindrical screen mounted concentrically with the aforesaid cylindrical screen, the second screen being of similarly sized mesh to the aforesaid screen.

References Cited

UNITED STATES PATENTS

| | | | |
|---|---|---|---|
| 693,025 | 2/1902 | Jessup | 209—263 |
| 2,748,951 | 6/1956 | Dubach | 210—403 |
| 3,067,087 | 12/1962 | Gorski | 162—179 X |
| 3,145,164 | 8/1964 | Jonkman | 209—270 X |
| 2,916,142 | 12/1954 | Fontein | 209—274 |
| 2,942,730 | 6/1960 | Fontein | 209—273 X |

FOREIGN PATENTS

| | | |
|---|---|---|
| 42,131 | 11/1925 | Norway. |
| 594,371 | 3/1960 | Canada. |
| 1,161,466 | 3/1958 | France. |

HARRY B. THORNTON, Primary Examiner

ROBERT HALPER, Assistant Examiner

U.S. Cl. X.R.

209—254, 270, 284, 290